United States Patent
Hirakawa

(10) Patent No.: US 10,689,487 B2
(45) Date of Patent: Jun. 23, 2020

(54) POLYCARBONATE COPOLYMER, OPTICAL LENS AND FILM IN WHICH SAID POLYCARBONATE COPOLYMER IS USED, AND METHOD FOR PRODUCING SAID COPOLYMER

(71) Applicant: MITSUBISHI GAS CHEMICAL COMPANY, INC., Tokyo (JP)

(72) Inventor: Manabu Hirakawa, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 19 days.

(21) Appl. No.: 16/090,404

(22) PCT Filed: Apr. 3, 2017

(86) PCT No.: PCT/JP2017/013869
§ 371 (c)(1),
(2) Date: Oct. 1, 2018

(87) PCT Pub. No.: WO2017/175693
PCT Pub. Date: Oct. 12, 2017

(65) Prior Publication Data
US 2019/0119442 A1    Apr. 25, 2019

(30) Foreign Application Priority Data
Apr. 5, 2016 (JP) .................. 2016-075919

(51) Int. Cl.
| | | |
|---|---|---|
| C08G 64/02 | (2006.01) | |
| C08G 64/16 | (2006.01) | |
| G02B 1/04 | (2006.01) | |
| C08G 64/30 | (2006.01) | |
| C08J 5/18 | (2006.01) | |

(52) U.S. Cl.
CPC ......... *C08G 64/1608* (2013.01); *C08G 64/02* (2013.01); *C08G 64/0208* (2013.01); *C08G 64/16* (2013.01); *C08G 64/307* (2013.01); *C08J 5/18* (2013.01); *G02B 1/041* (2013.01); *C08J 2369/00* (2013.01)

(58) Field of Classification Search
USPC .......... 528/196, 198, 209, 271, 272
See application file for complete search history.

(56) References Cited

U.S. PATENT DOCUMENTS

| | | |
|---|---|---|
| 2010/0196720 A1 | 8/2010 | Kato et al. |
| 2011/0003101 A1 | 1/2011 | Fuji et al. |
| 2017/0088504 A1 | 3/2017 | Motoi et al. |
| 2017/0276837 A1 | 9/2017 | Kato et al. |

FOREIGN PATENT DOCUMENTS

| | | |
|---|---|---|
| EP | 2053072 A1 | 4/2009 |
| JP | 2-69520 A | 3/1990 |
| JP | 4-338594 A | 11/1992 |
| JP | 5-70584 A | 3/1993 |
| JP | 5-155964 A | 6/1993 |
| JP | 5-341124 A | 12/1993 |
| JP | 6-36346 A | 2/1994 |
| JP | 200916746 A | 7/2009 |
| WO | 2015147242 A1 | 10/2015 |
| WO | 2016/052370 A1 | 4/2016 |

OTHER PUBLICATIONS

Extended European Search Report dated Mar. 14, 2019 in European application No. 17779071.4.
International Search Report in International Patent Application No. PCT/JP2017/013869, dated Jun. 20, 2017.
International Preliminary Report on Patentability in International Patent Application No. PCT/JP20171013869, dated Oct. 9, 2018.

*Primary Examiner* — Terressa Boykin
(74) *Attorney, Agent, or Firm* — Greenblum & Bernstein, P.L.C.

(57) ABSTRACT

The present invention makes it possible to provide a polycarbonate copolymer including structural units represented by general formula (K) and structural units represented by general formula (1).

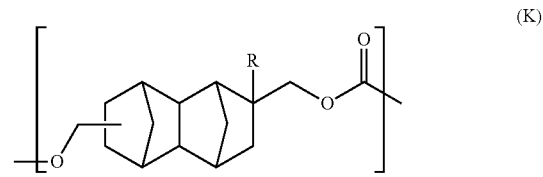

(In general formula (K), R represents H, $CH_3$ or $CH_2CH_3$.)

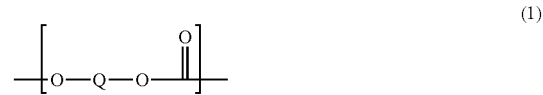

(In general formula (1), Q represents a C5 or higher aliphatic hydrocarbon group optionally including a hetero atom.).

11 Claims, 3 Drawing Sheets

[Figure 1]
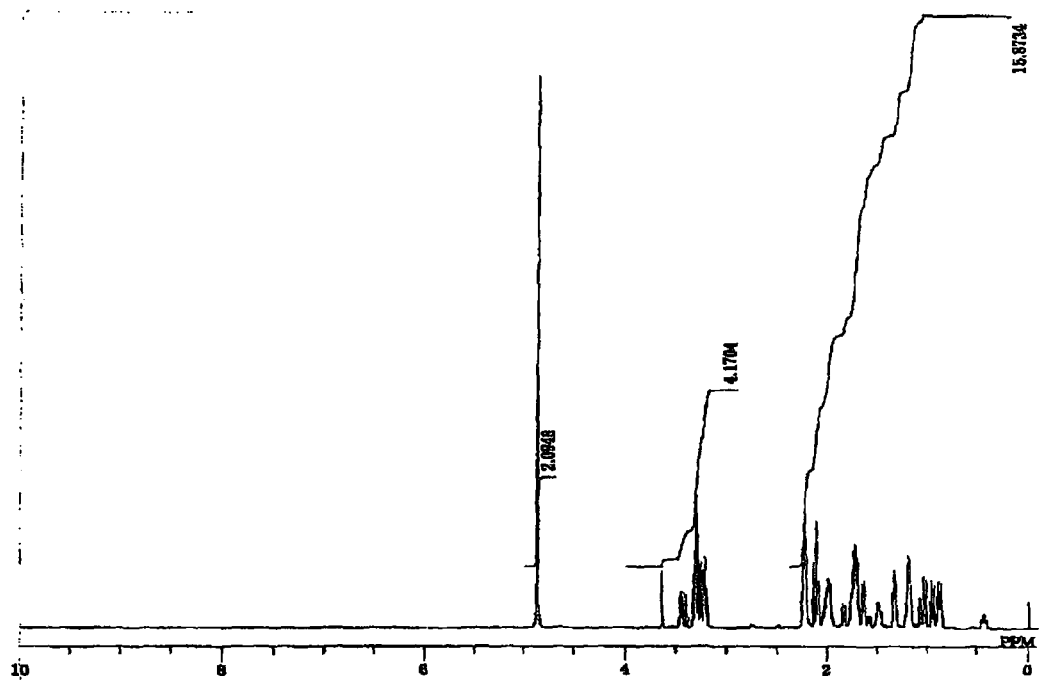
[Figure 2]
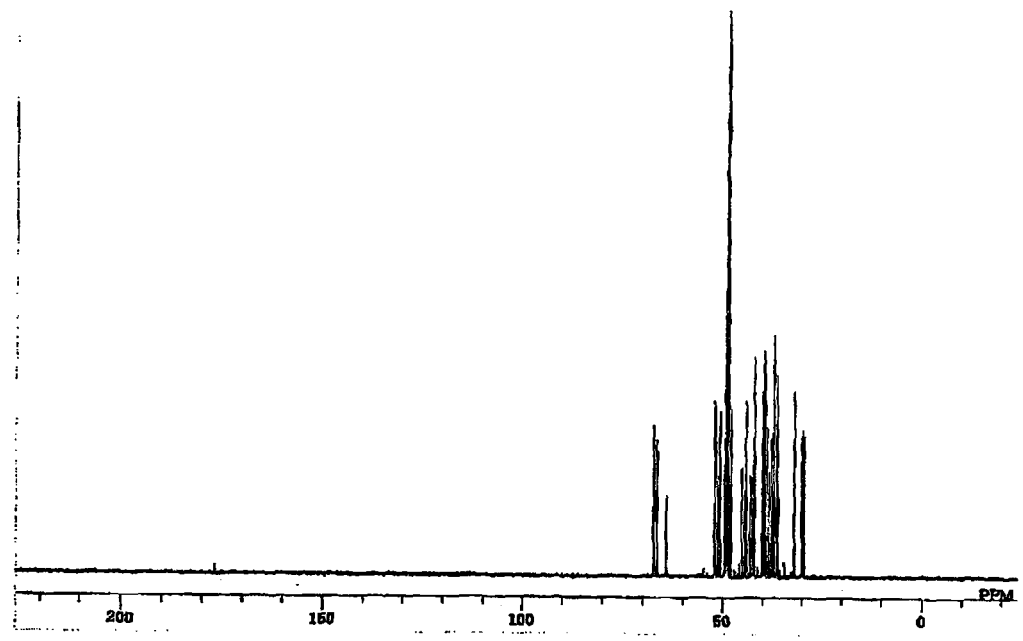

[Figure 3]
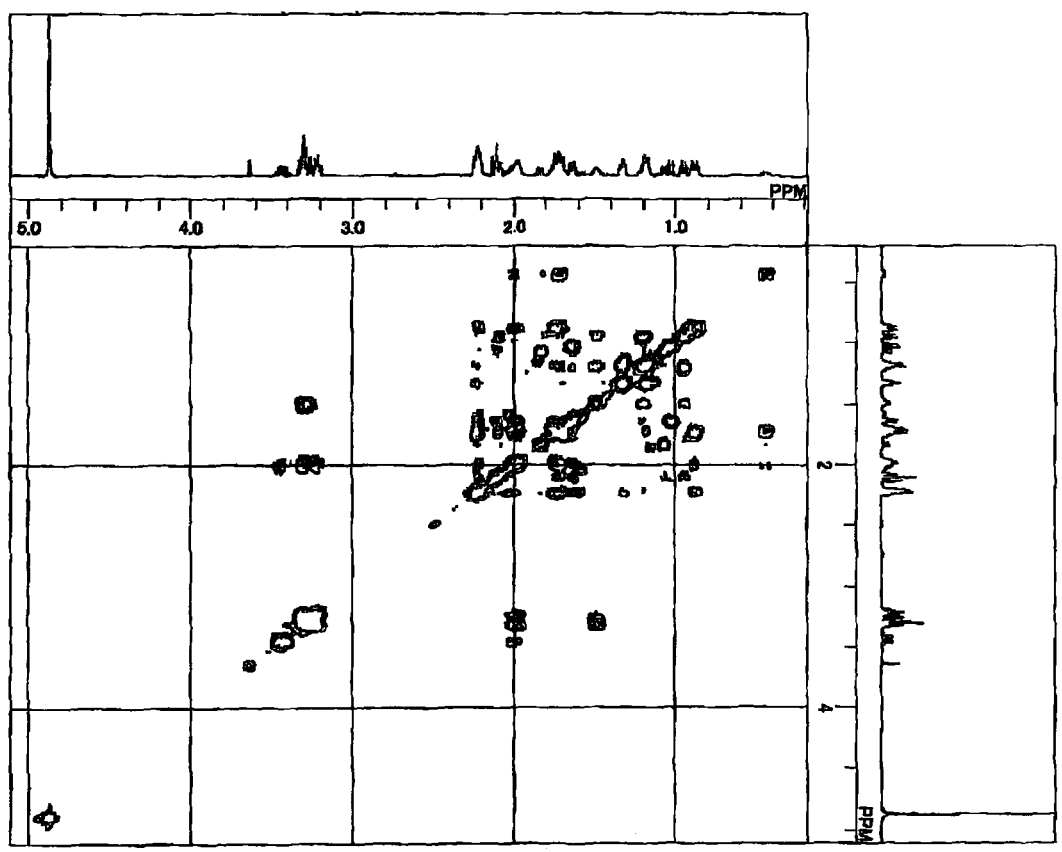

[Figure 4]
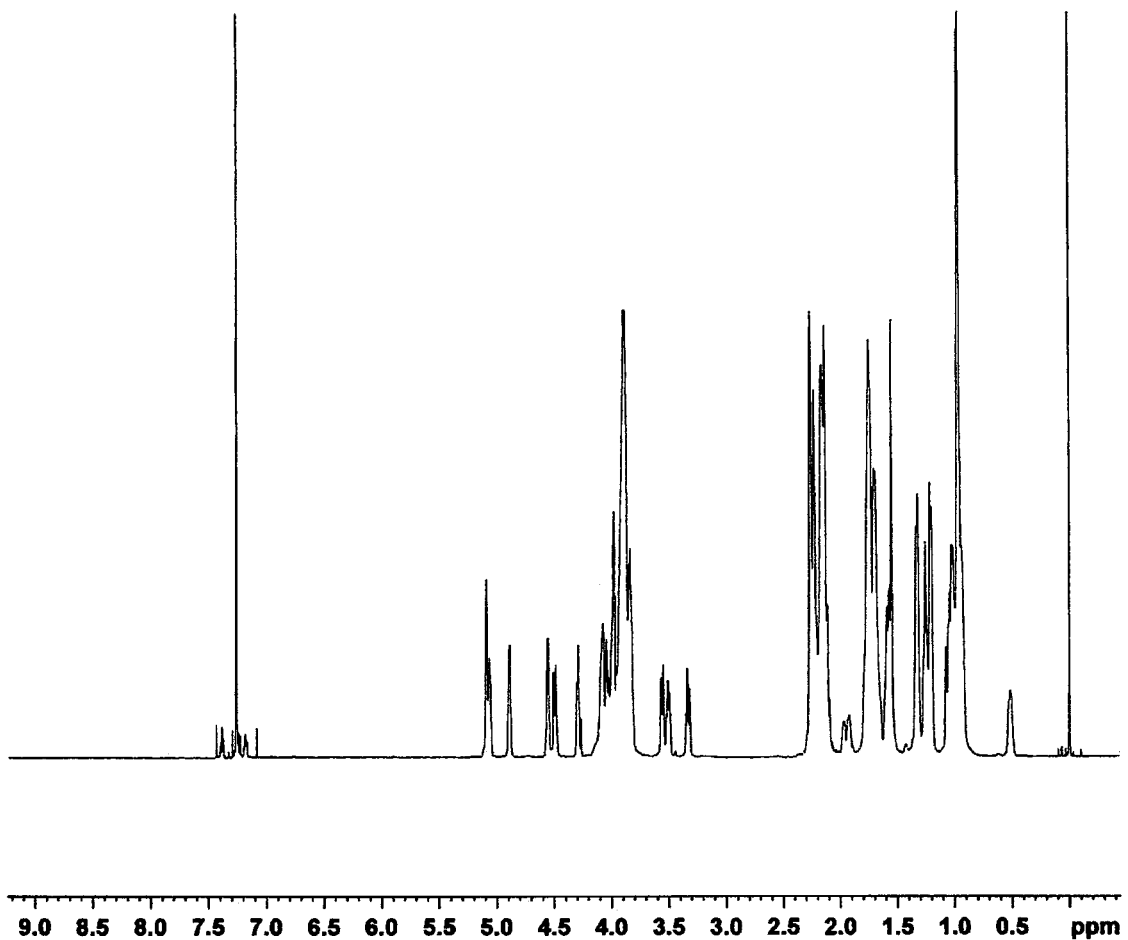

POLYCARBONATE COPOLYMER, OPTICAL LENS AND FILM IN WHICH SAID POLYCARBONATE COPOLYMER IS USED, AND METHOD FOR PRODUCING SAID COPOLYMER

TECHNICAL FIELD

The present invention relates to a novel polycarbonate copolymer, and an optical lens and a film which are formed by using the same. The present invention also relates to a method for producing the copolymer.

BACKGROUND ART

As a material of optical elements to be used in optical systems of various cameras such as cameras, film integrated type cameras and video cameras, an optical glass or an optical transparent resin is used. Optical glasses are excellent in heat resistance, transparency, size stability, chemical resistance, etc., and there are various materials with different refractive indexes (nD) or Abbe numbers (vD). However, optical glasses have problems of high material costs, bad molding processability and low productivity. In particular, significantly advanced techniques and high costs are required for processing for obtaining an aspherical lens to be used for aberration correction, and this is a major obstacle from a practical viewpoint.

Meanwhile, advantageously, optical lenses made of optical transparent resins, particularly thermoplastic transparent resins can be mass-produced by injection molding, and in addition, an aspherical lens can be easily produced therefrom. Such optical lenses are currently used for camera lenses. Examples thereof include a polycarbonate made of bisphenol A, polystyrene, poly-4-methylpentene, polymethyl methacrylate and an amorphous polyolefin.

However, when using an optical transparent resin as an optical lens, in addition to the refractive index and Abbe number, transparency, heat resistance and low birefringence are also required, and therefore it has a weak point that portions for use thereof are limited depending on the balance of characteristics of the resin. For example, polystyrene has low heat resistance and high birefringence, poly-4-methylpentene has low heat resistance, polymethyl methacrylate has a low glass transition temperature, low heat resistance and a low refractive index, and therefore use areas of these materials are limited, and a polycarbonate consisting of bisphenol A has weak points such as high birefringence, and therefore portions for use thereof are limited.

Regarding the optical design of optical units, it is known that there is a method in which chromatic aberration is corrected by combined use of a plurality of lenses with different Abbe numbers. For example, chromatic aberration is corrected by combined use of a lens made of a cycloolefin resin having a relatively high Abbe number and a lens made of a polycarbonate resin consisting of bisphenol A having a low Abbe number. However, there is a difference between the hygroscopic expansion coefficient of the cycloolefin resin and the hygroscopic expansion coefficient of the polycarbonate resin, and when forming a lens unit by combining these two types of lenses, the difference between the sizes of the lenses is made at the time of water absorption depending on an operating environment of a smartphone or the like. Due to the difference of the expansion rate, performance of the lens is impaired.

Patent Documents 1 to 3 describe polycarbonate copolymers containing a perhydroxy dimethanonaphthalene skeleton, but since the dihydroxymethyl group is positioned at 2,3-position in each case, the strength is low, and therefore these materials are not suitable for use in optical lenses.

Moreover, recently, it has been remarkably desired to realize wider angles of, for example, front cameras and rear cameras of smartphones. However, there is a problem that partial chromatic aberration is increased in association with wider angles. For this reason, materials having excellent optical characteristics with heat resistance and a higher Abbe number are desired.

PRIOR ART DOCUMENTS

Patent Documents

Patent Document 1: Japanese Laid-Open Patent Publication No. H05-70584
Patent Document 2: Japanese Laid-Open Patent Publication No. H02-69520
Patent Document 3: Japanese Laid-Open Patent Publication No. H05-341124

SUMMARY OF THE INVENTION

Problems to be Solved by the Invention

The problems to be solved by the present invention are to provide a polycarbonate copolymer having excellent optical characteristics with heat resistance and a high Abbe number, and an optical lens and a film formed by using the copolymer, and to provide a method for producing the copolymer.

Means for Solving the Problems

The present inventors diligently made researches in order to solve the aforementioned problems and found that a polycarbonate copolymer including specific structural units can solve the problems, and thus the present invention was achieved.

Specifically, the present invention relates to a polycarbonate copolymer, an optical lens and a film obtained by using the same and a method for producing the copolymer as described below.

<1> A polycarbonate copolymer, which comprises: a structural unit represented by general formula (K):

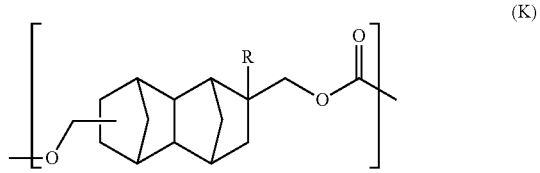

wherein in general formula (K), R represents H, $CH_3$ or $CH_2CH_3$; and
a structural unit represented by general formula (1):

wherein in general formula (1), Q represents a C5 or higher aliphatic hydrocarbon group optionally including a hetero atom.

<2> The polycarbonate copolymer according to item <1>, wherein Q in general formula (1) has a $C_{5\text{-}30}$ alicyclic hydrocarbon group consisting of a carbon atom, an oxygen atom and a hydrogen atom.

<3> The polycarbonate copolymer according to item <1> or <2>, wherein general formula (1) is at least one selected from the group consisting of formula (2) to formula (6):

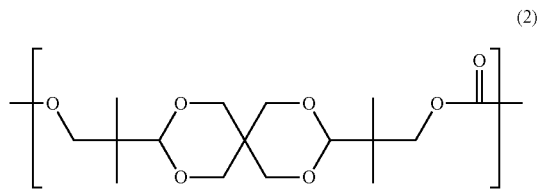

(2)

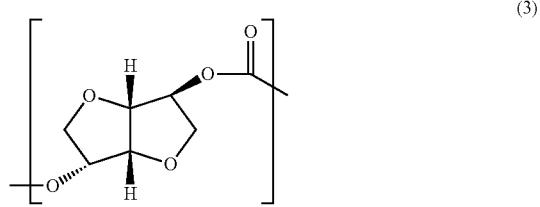

(3)

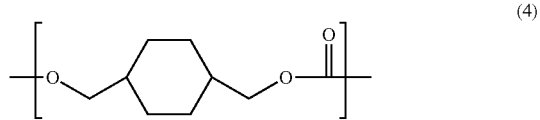

(4)

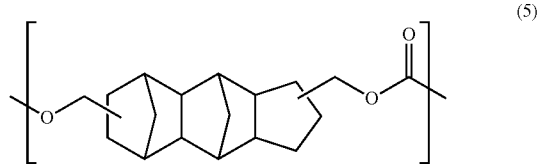

(5)

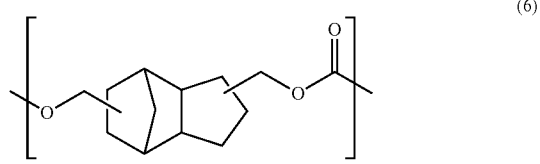

(6)

<4> The polycarbonate copolymer according to item <3>, wherein general formula (1) is at least one selected from formula (2) and formula (3).

<5> The polycarbonate copolymer according to any one of items <1> to <4>, wherein the copolymerization ratio (mol %) between the structural unit represented by general formula (K) and the structural unit represented by general formula (1) is such that the structural unit represented by general formula (K): the structural unit represented by general formula (1)=20:80 to 90:10.

<6> The polycarbonate copolymer according to any one of items <1> to <5>, wherein R in general formula (K) is H.

<7> The polycarbonate copolymer according to any one of items <1> to <6>, which has an Abbe number of 55 or higher.

<8> The polycarbonate copolymer according to any one of items <1> to <7>, which has a polystyrene equivalent weight-average molecular weight of 20,000 to 70,000.

<9> The polycarbonate copolymer according to any one of items <1> to <8>, which further comprises a structural unit represented by general formula (B):

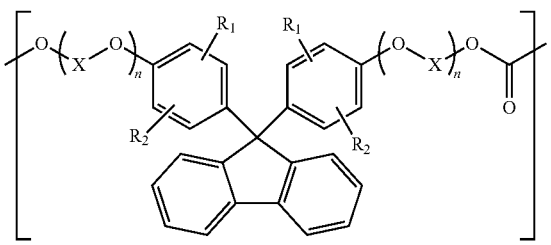

(B)

wherein: $R_1$ and $R_2$ are each independently selected from a hydrogen atom, a $C_{1\text{-}20}$ alkyl group, a $C_{1\text{-}20}$ alkoxyl group, a $C_{5\text{-}20}$ cycloalkyl group, a $C_{5\text{-}20}$ cycloalkoxyl group, a $C_{6\text{-}20}$ aryl group, a $C_{6\text{-}20}$ aryloxy group and a halogen atom; Xs each independently represent a branched or unbranched $C_{2\text{-}6}$ alkylene group; and ns each independently represent an integer of 0 to 5.

<10> The polycarbonate copolymer according to item <9>, wherein: the ratio of the structural unit represented by general formula (K) is 10 to 50 mol %; the ratio of the structural unit represented by general formula (1) is 20 to 60 mol %; and the ratio of the structural unit represented by general formula (B) is 20 to 40 mol %.

<11> An optical lens obtained by using the polycarbonate copolymer according to any one of items <1> to <10>.

<12> A film obtained by using the polycarbonate copolymer according to any one of items <1> to <10>.

<13> A method for producing the polycarbonate copolymer according to any one of items <1> to <8>, wherein a dihydroxy compound including: a dihydroxy compound represented by general formula (L):

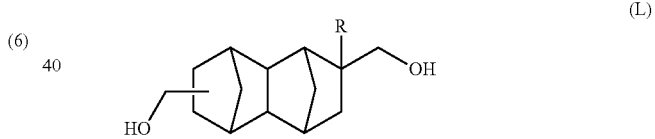

(L)

wherein in general formula (L), R represents H, $CH_3$ or $CH_2CH_3$; and
a dihydroxy compound represented by general formula (I):

HO-Q-OH (I)

wherein in general formula (I), Q represents a C5 or higher aliphatic hydrocarbon group optionally including a hetero atom;
is melt-polycondensed with a carbonic acid diester.

Advantageous Effect of the Invention

According to the present invention, it is possible to provide a polycarbonate copolymer having excellent optical characteristics with heat resistance and a high Abbe number, an optical lens and a film obtained by using the same, and a method for producing the copolymer.

BRIEF DESCRIPTION OF THE DRAWINGS

FIG. 1 shows results of the $^1$H-NMR measurement of the main reaction product obtained in Monomer Synthesis Example 1.

FIG. 2 shows results of the $^{13}$C-NMR measurement of the main reaction product obtained in Monomer Synthesis Example 1.

FIG. 3 shows results of the COSY-NMR measurement of the main reaction product obtained in Monomer Synthesis Example 1.

FIG. 4 shows results of the $^{1}$H-NMR measurement of the polycarbonate copolymer obtained in Example 1.

EMBODIMENTS FOR CARRYING OUT THE INVENTION

Hereinafter, the mode for carrying out the present invention will be described in detail. However, the present invention is not limited thereto and can be modified variously without departing from the gist of the present invention.

(a) Polycarbonate Copolymer

The polycarbonate copolymer of the present invention is a polycarbonate copolymer including a structural unit represented by general formula (K) and a structural unit represented by general formula (1).

The structural unit represented by general formula (K) (hereinafter referred to as "the structural unit (K)") is, for example, a structural unit derived from a dihydroxy compound represented by general formula (L) below. Examples thereof include a structural unit derived from decahydro-1,4:5,8-dimethanonaphthalene diol (hereinafter sometimes referred to as "D-NDM").

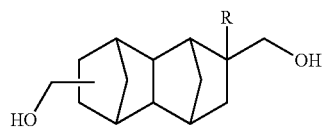

(L)

(In general formula (L), R represents H, CH$_3$ or CH$_2$CH$_3$.)

The structural unit (K) is preferably a mixture of an isomer represented by general formula (M) below to which a —CH$_2$O— group is bound at 6-position (isomer of 2,6-position) and an isomer represented by general formula (N) below to which a —CH$_2$O— group is bound at 7-position (isomer of 2,7-position). From the viewpoint of physical properties of the resin such as strength and tensile elongation of the resin and outer appearance of a molded body, the mass ratio of the isomer of 2,6-position: the isomer of 2,7-position is preferably 1.0:99.0 to 99.0:1.0. It is more preferred that the isomer of 2,6-position: the isomer of 2,7-position is 20:80 to 80:20, and it is particularly preferred that the isomer of 2,6-position: the isomer of 2,7-position is 50:50 to 80:20. In the present invention, no isomer of 2,3-position is included.

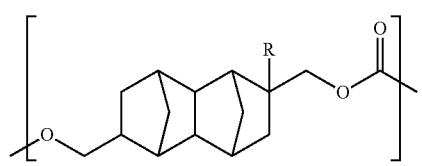

(M)

(In general formula (M), R represents H, CH$_3$ or CH$_2$CH$_3$.)

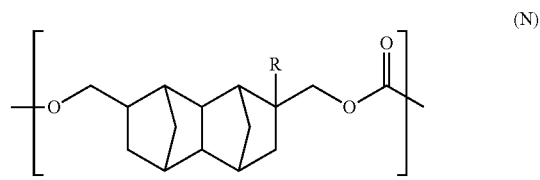

(N)

(In general formula (N), R represents H, CH$_3$ or CH$_2$CH$_3$.)

Examples of the structural unit represented by general formula (M) (hereinafter referred to as "the structural unit (M)") include a structural unit derived from a dihydroxy compound represented by general formula (P) below. Examples of the structural unit represented by general formula (N) (hereinafter referred to as "the structural unit (N)") include a structural unit derived from a dihydroxy compound represented by general formula (O) below.

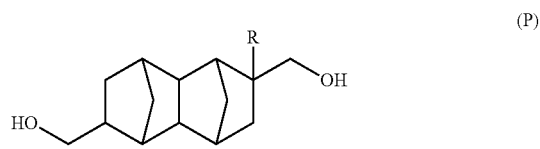

(P)

(In general formula (P), R represents H, CH$_3$ or CH$_2$CH$_3$.)

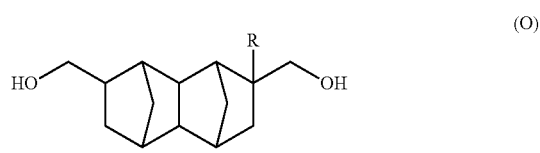

(O)

(In general formula (O), R represents H, CH$_3$ or CH$_2$CH$_3$.)

In general formulae (K), (L), (M), (N), (P) and (O) above, all Rs are preferably the same, and from the viewpoint of the distributability, R is preferably H.

Examples of the structural unit represented by general formula (1) (hereinafter referred to as "the structural unit (1)") include a structural unit derived from a dihydroxy compound represented by general formula (I) below.

HO-Q-OH  (I)

Q in general formula (1) has a C5 or higher alicyclic hydrocarbon group optionally including a hetero atom. Preferred examples of the hetero atom include an oxygen atom, a sulfur atom and a nitrogen atom, and particularly preferred examples thereof include an oxygen atom. Q in general formula (1) preferably has a C5 or higher alicyclic hydrocarbon group consisting of a carbon atom, an oxygen atom and a hydrogen atom, and more preferably has a C$_{5-30}$ alicyclic hydrocarbon group consisting of a carbon atom, an oxygen atom and a hydrogen atom. Such a structure tends to realize further improvement of the strength of a molded body and an Abbe number.

The structural unit represented by general formula (1) is preferably at least one selected from the group consisting of formula (2) to formula (6):

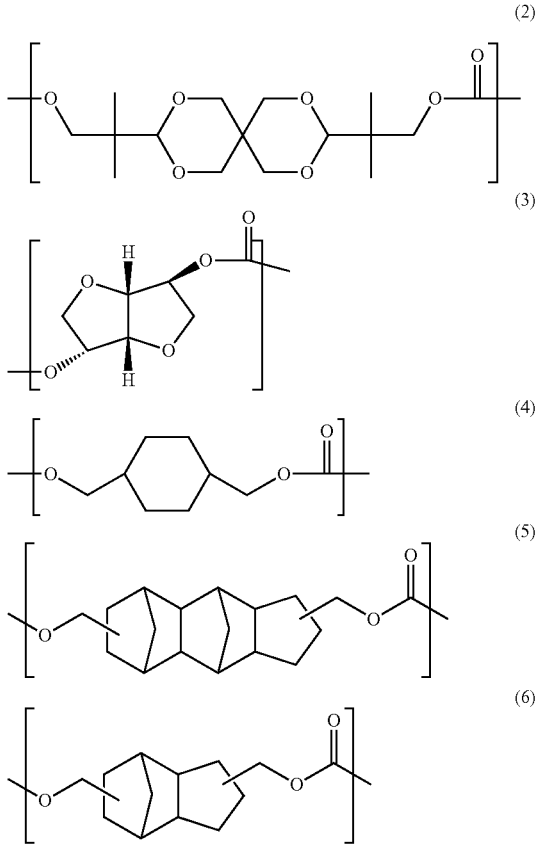

The structural unit represented by formula (2) is derived from spiroglycol (hereinafter sometimes referred to as "SPG"). The structural unit represented by formula (3) is derived from isosorbide (hereinafter sometimes referred to as "ISB"). The structural unit represented by formula (4) is derived from 1,4-cyclohexanedimethanol (hereinafter sometimes referred to as "CHDM"). The structural unit represented by formula (5) is derived from pentacyclopentadecanedimethanol (hereinafter sometimes referred to as "PCPDM"). The structural unit represented by formula (6) is derived from tricyclodecanedimethanol (hereinafter sometimes referred to as "TCDDM"). In particular, the structural unit (1) is preferably at least one selected from the structural unit represented by formula (2) and the structural unit represented by formula (3). Such a structural unit tends to further increase an Abbe number of a molded body obtained.

As described later, the polycarbonate copolymer including the structural unit (K) and the structural unit (1) is obtained by melt-polycondensing a dihydroxy compound including a dihydroxy compound represented by general formula (L) and a dihydroxy compound represented by general formula (I) with a carbonic acid diester.

Regarding the copolymerization ratio (mol %) between the structural unit represented by general formula (K) and the structural unit represented by general formula (1), the structural unit represented by general formula (K): the structural unit represented by general formula (1) is preferably 20:80 to 90:10, and more preferably 20:80 to 80:20. In particular, when the ratio is within the above-described range, a copolymer having a high Abbe number and excellent heat resistance and optical characteristics can be obtained.

The polycarbonate copolymer of the present invention includes the structural unit (K) and the structural unit (1), and may also include another structural unit within a range in which the effects of the present invention are not reduced. The ratio of the sum of the structural unit (K) and the structural unit (1) in the polycarbonate copolymer of the present invention is preferably 70% by mass or more, and more preferably 100% by mass.

The aforementioned another structural unit is a structural unit obtained by reacting a diol compound other than those of general formulae (L) and (I) with a carbonic acid diester. Examples of the diol compound other than those of general formulae (L) and (I) include bisphenol A, bisphenol AP, bisphenol AF, bisphenol B, bisphenol BP, bisphenol C, bisphenol E, bisphenol F, bisphenol G, bisphenol M, bisphenol S, bisphenol P, bisphenol PH, bisphenol TMC, bisphenol Z, and a fluorene-based diol compound represented by general formula (A) below:

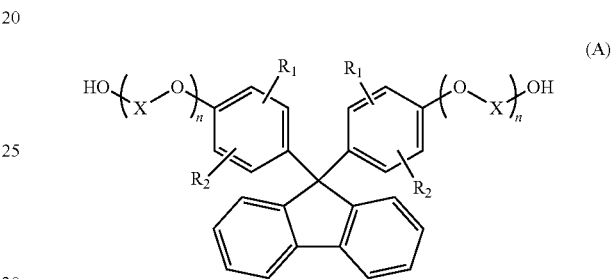

(A)

In general formula (A): $R_1$ and $R_2$ are each independently selected from a hydrogen atom, a $C_{1-20}$ alkyl group, a $C_{1-20}$ alkoxyl group, a $C_{5-20}$ cycloalkyl group, a $C_{5-20}$ cycloalkoxyl group, a $C_{6-20}$ aryl group, a $C_{6-20}$ aryloxy group and a halogen atom; Xs each independently represent a branched or unbranched $C_{2-6}$ alkylene group; and ns each independently represent an integer of 0 to 5.

Such diol compounds other than those of general formulae (L) and (I) may be used solely, or two or more of them may be used in combination.

Specific examples of the fluorene-based diol compound represented by general formula (A) include 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 9,9-bis(4-hydroxyphenyl)fluorene, 9,9-bis(4-hydroxy-3-methylphenyl)fluorene, 9,9-bis(4-hydroxy-3-tert-butylphenyl)fluorene, 9,9-bis(4-hydroxy-3-isopropylphenyl)fluorene, 9,9-bis(4-hydroxy-3-cyclohexylphenyl)fluorene, 9,9-bis(4-hydroxy-3-phenylphenyl)fluorene, 9,9-bis(4-(2-hydroxypropoxy)phenyl)fluorene, 9,9-bis(4-(2-hydroxypropoxy)-3-methylphenyl)fluorene, 9,9-bis(4-(2-hydroxypropoxy)-3-tert-butylphenyl)fluorene, 9,9-bis(4-(2-hydroxypropoxy)-3-isopropylphenyl)fluorene, 9,9-bis(4-(2-hydroxypropoxy)-3-cyclohexylphenyl)fluorene and 9,9-bis(4-(2-hydroxypropoxy)-3-phenylphenyl)fluorene. Among them, 9,9-bis(4-(2-hydroxyethoxy)phenyl)fluorene and 9,9-bis(4-(2-hydroxyethoxy)-3-phenylphenyl)fluorene are preferred.

In the present invention, when using the fluorene-based diol compound represented by general formula (A) as the diol compound other than those of general formulae (L) and (I), a polycarbonate copolymer obtained is useful not only for optical lenses, but also for films. Such fluorene-based diol compounds represented by general formula (A) may be used solely, or two or more of them may be used in combination.

In particular, compounds represented by general formula (A), wherein n is 0 or 1, for example, 9,9-bis(4-hydroxyphenyl)fluorene, 9,9-bis(4-hydroxy-3-methylphenyl)fluorene, 9,9-bis(4-hydroxy-3-tert-butylphenyl)fluorene, 9,9-bis(4-hydroxy-3-isopropylphenyl)fluorene, 9,9-bis(4-hydroxy-3-cyclohexylphenyl)fluorene, 9,9-bis(4-hydroxy-3-phenylphenyl)fluorene, 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, etc. are preferably used for film applications.

Examples of more preferred diol compounds include 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-phenylphenyl)fluorene, 9,9-bis(4-hydroxyphenyl)fluorene and 9,9-bis(4-hydroxy-3-methylphenyl) fluorene.

A polycarbonate copolymer produced by using the above-described three types of diol compounds is excellent in at least one of photoelastic coefficient, wavelength dispersion characteristics, film strength (tensile strength, tear strength, etc.), heat resistance, coating properties, deposition properties, transparency, transmittance and hydrolysis resistance.

The ratio of the structural unit represented by general formula (K) in the polycarbonate copolymer produced by using the above-described three types of diol compounds is preferably 10 to 50 mol %, and more preferably 10 to 30 mol %. The ratio of the structural unit represented by general formula (1) is preferably 20 to 60 mol %, and more preferably 40 to 60 mol %. The ratio of the structural unit represented by general formula (B) is preferably 20 to 40 mol %

In particular, when the ratios are within the above-described ranges, a copolymer excellent in at least one of wavelength dispersion characteristics, photoelastic coefficient, coat adhesion, transparency, transmittance, film processability, hydrolysis resistance and film elongation properties is obtained.

Specific examples of film applications include an organic EL film, an antireflection film, a transparent conductive film, a highly heat-resistant film, a polarizing plate protective film, a phase difference film, a luminance improvement film and a light shielding film.

Further, to the polycarbonate copolymer of the present invention, an antioxidant, a mold release agent, a processing stabilizer, an ultraviolet absorber, a flowability improving agent, a crystal nucleating agent, a toughening agent, a dye, an antistatic agent, an antimicrobial agent or the like is preferably added.

Examples of the antioxidant include triethylene glycol-bis[3-(3-tert-butyl-5-methyl-4-hydroxyphenyl)propionate], 1,6-hexanediol-bis[3-(3,5-di-tert-butyl-4-hydroxyphenyl) propionate], pentaerythritol tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylene bis(3,5-di-tert-butyl-4-hydroxyhydrocinnamide), 3,5-di-tert-butyl-4-hydroxybenzylphosphonate-diethyl ester, tris(3,5-di-tert-butyl-4-hydroxybenzyl) isocyanurate and 3,9-bis{1,1-dimethyl-2-[β-(3-tert-butyl-4-hydroxy-5-methylphenyl)propionyloxy] ethyl}-2,4,8,10-tetraoxaspiro(5,5)undecane. Among them, pentaerythritol tetrakis[3-(3,5-di-tert-butyl-4-hydroxyphenyl)propionate] is more preferred. The content of the antioxidant in the polycarbonate resin is preferably 0.001 to 0.3 parts by weight relative to 100 parts by weight of the polycarbonate resin.

Regarding the mold release agent, it is preferred that 90 wt % or more of it is made of an ester of an alcohol and a fatty acid. Specific examples of the ester of an alcohol and a fatty acid include an ester of a monohydric alcohol and a fatty acid and a partial ester or whole ester of a polyhydric alcohol and a fatty acid. As the above-described ester of a monohydric alcohol and a fatty acid, an ester of a monohydric alcohol having 1 to 20 carbon atoms and a saturated fatty acid having 10 to 30 carbon atoms is preferred. Further, as the partial ester or whole ester of a polyhydric alcohol and a fatty acid, a partial ester or whole ester of a polyhydric alcohol having 1 to 25 carbon atoms and a saturated fatty acid having 10 to 30 carbon atoms is preferred.

Specific examples of the ester of a monohydric alcohol and a saturated fatty acid include stearyl stearate, palmityl palmitate, butyl stearate, methyl laurate and isopropyl palmitate. Specific examples of the partial ester or whole ester of a polyhydric alcohol and a saturated fatty acid include whole esters or partial esters of monoglyceride stearate, diglyceride stearate, triglyceride stearate, monosorbitate stearate, monoglyceride behenate, monoglyceride caprate, monoglyceride laurate, pentaerythritol monostearate, pentaerythritol tetrastearate, pentaerythritol tetrapelargonate, propylene glycol monostearate, biphenyl biphenate, sorbitan monostearate, 2-ethylhexyl stearate and dipentaerythritols such as dipentaerythritol hexastearate. Among them, monoglyceride stearate and monoglyceride laurate are particularly preferred. The content of these mold release agents is preferably 0.005 to 2.0 parts by weight, more preferably 0.01 to 0.6 parts by weight, and even more preferably 0.02 to 0.5 parts by weight relative to 100 parts by weight of the polycarbonate resin.

Examples of the processing stabilizer include a phosphorus-based processing heat stabilizer and a sulfur-based processing heat stabilizer. Examples of the phosphorus-based processing heat stabilizer include phosphorous acid, phosphoric acid, phosphonous acid, phosphonic acid and esters thereof. Specific examples thereof include triphenyl phosphite, tris(nonylphenyl) phosphite, tris(2,4-di-tert-butylphenyl) phosphite, tris(2,6-di-tert-butylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl) pentaerythritol diphosphite, 2,2-methylenebis(4,6-di-tert-butylphenyl) octylphosphite, bis(nonylphenyl) pentaerythritol diphosphite, bis(2,4-dicumylphenyl) pentaerythritol diphosphite, bis(2,4-di-tert-butylphenyl) pentaerythritol diphosphite, distearylpentaerythritol diphosphite, tributyl phosphate, triethyl phosphate, trimethyl phosphate, triphenyl phosphate, diphenyl monoorthoxenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-t-butylphenyl)-4,4'-biphenylene diphosphonate, tetrakis(2,4-di-t-butylphenyl)-4,3'-biphenylene diphosphonate, tetrakis(2,4-di-t-butylphenyl)-3,3'-biphenylene diphosphonate, bis(2,4-di-tert-butylphenyl)-4-phenyl-phenylphosphonate and bis(2,4-di-tert-butylphenyl)-3-phenyl-phenylphosphonate.

Among them, bis(2,6-di-tert-butyl-4-methylphenyl) pentaerythritol diphosphite is more preferred. The content of the phosphorus-based processing heat stabilizer in the polycarbonate resin is preferably 0.001 to 0.2 parts by weight relative to 100 parts by weight of the polycarbonate resin.

Examples of the sulfur-based processing heat stabilizer include pentaerythritol-tetrakis(3-lauryl thiopropionate), pentaerythritol-tetrakis(3-myristyl thiopropionate), pentaerythritol-tetrakis(3-stearyl thiopropionate), dilauryl-3,3'-thiodipropionate, dimyristyl-3,3'-thiodipropionate and distearyl-3,3'-thiodipropionate. The content of the sulfur-based processing heat stabilizer in the polycarbonate resin is preferably 0.001 to 0.2 parts by weight relative to 100 parts by weight of the polycarbonate resin.

The ultraviolet absorber is preferably at least one ultraviolet absorber selected from the group consisting of a benzotriazole-based ultraviolet absorber, a benzophenone-based ultraviolet absorber, a triazine-based ultraviolet absorber, a cyclic iminoester-based ultraviolet absorber and a cyanoacrylate-based ultraviolet absorber. That is, ultraviolet absorbers mentioned below may be used solely, or two or more of them may be used in combination.

Examples of the benzotriazole-based ultraviolet absorber include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one) and 2-[2-hydroxy-3-(3,4,5,6-tetrahydrophthalimidomethyl)-5-methylphenyl]benzotriazole.

Examples of the benzophenone-based ultraviolet absorber include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydrate benzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodiumsulfoxybenzophenone, bis(5-benzoyl-4-hydroxy-2-methoxyphenyl)methane, 2-hydroxy-4-n-dodecyloxybenzophonone and 2-hydroxy-4-methoxy-2'-carboxybenzophenone.

Examples of the triazine-based ultraviolet absorber include 2-(4,6-diphenyl-1,3,5-triazin-2-yl)-5-[(hexyl)oxy]-phenol and 2-(4,6-bis(2,4-dimethylphenyl)-1,3,5-triazin-2-yl)-5-[(octyl)oxy]-phenol.

Examples of the cyclic iminoester-based ultraviolet absorber include 2,2'-bis(3,1-benzoxazin-4-one), 2,2'-p-phenylenebis(3,1-benzoxazin-4-one), 2,2'-m-phenylenebis(3,1-benzoxazin-4-one), 2,2'-(4,4'-diphenylene)bis(3,1-benzoxazin-4-one), 2,2'-(2,6-naphthalene)bis(3,1-benzoxazin-4-one), 2,2'-(1,5-naphthalene)bis(3,1-benzoxazin-4-one), 2,2'-(2-methyl-p-phenylene)bis(3,1-benzoxazin-4-one), 2,2'-(2-nitro-p-phenylene)bis(3,1-benzoxazin-4-one) and 2,2'-(2-chloro-p-phenylene)bis(3,1-benzoxazin-4-one).

Examples of the cyanoacrylate-based ultraviolet absorber include 1,3-bis-[(2'-cyano-3',3'-diphenylacryloyl)oxy]-2,2-bis[(2-cyano-3,3-diphenylacryloyl)o xy]methyl)propane and 1,3-bis-[(2-cyano-3,3-diphenylacryloyl)oxy]benzene.

The content of the ultraviolet absorber is preferably 0.01 to 3.0 parts by weight, more preferably 0.02 to 1.0 parts by weight, and even more preferably 0.05 to 0.8 parts by weight relative to 100 parts by weight of the polycarbonate resin. When the content is within these ranges, sufficient weatherability can be imparted to the polycarbonate resin according to intended use.

In the polycarbonate resin, phenol produced at the time of the production and carbonic acid diester which is unreacted and remains are present as impurities. The phenol content in the polycarbonate resin is preferably 0.1 to 3000 ppm, more preferably 0.1 to 2000 ppm, and particularly preferably 1 to 1000 ppm, 1 to 800 ppm, 1 to 500 ppm or 1 to 300 ppm. Further, the carbonic acid diester content in the polycarbonate resin is preferably 0.1 to 1000 ppm, more preferably 0.1 to 500 ppm, and particularly preferably 1 to 100 ppm. By adjusting the amounts of phenol and carbonic acid diester contained in the polycarbonate resin, a resin having physical properties appropriate for purposes can be obtained. The adjustment of the phenol content and the carbonic acid diester content can be suitably carried out by changing conditions for polycondensation and apparatuses. The adjustment can also be carried out by changing conditions for the extrusion process after polycondensation.

When the content of phenol or carbonic acid diester is more than the above-described ranges, it may cause problems such as reduction in the strength of a resin molded body obtained and generation of odor. Meanwhile, when the content of phenol or carbonic acid diester is less than the above-described ranges, it may cause reduction in the plasticity of a resin at the time of melting.

(b) Method for Producing the Polycarbonate Copolymer

The polycarbonate copolymer of the present invention can be produced by the melt polycondensation method using a dihydroxy compound represented by general formula (L), a dihydroxy compound represented by general formula (I) and a carbonic acid diester as raw materials. In the dihydroxy compound represented by general formula (L), a mixture of an isomer containing a hydroxymethyl group at 2,6-position and an isomer containing a hydroxymethyl group at 2,7-position is present. Regarding these isomers, the mass ratio of the isomer of 2,6-position: the isomer of 2,7-position is 0.1:99.9 to 99.9:0.1. From the viewpoint of physical properties of the resin such as the strength and tensile elongation of the resin and outer appearance of a molded body, the isomer of 2,6-position: the isomer of 2,7-position is preferably 1.0:99.0 to 99.0:1.0, more preferably 20:80 to 80:20, and particularly preferably 50:50 to 80:20. In the present invention, no isomer of 2,3-position is included. Moreover, use in combination with another diol compound may also be employed. The production can be carried out by this reaction in the presence of, as a polycondensation catalyst, a basic compound catalyst, a transesterification catalyst or a mixed catalyst made of these two catalysts.

Examples of the carbonic acid diester include diphenyl carbonate, ditolyl carbonate, bis(chlorophenyl) carbonate, m-cresyl carbonate, dimethyl carbonate, diethyl carbonate, dibutyl carbonate and dicyclohexyl carbonate. Among them, diphenyl carbonate is particularly preferred from the viewpoint of the reactivity and the purity. The carbonic acid diester is used at a ratio of preferably 0.97 to 1.20 mol, and more preferably 0.98 to 1.10 mol relative to 1 mol of the diol component. By adjusting the molar ratio, the molecular weight of the polycarbonate copolymer is controlled.

Examples of the basic compound catalyst include an alkali metal compound, an alkaline earth metal compound and a nitrogen-containing compound.

Examples of the alkali metal compound include an organic salt, inorganic salt, oxide, hydroxide, hydride or alkoxide of an alkali metal, etc. Specific examples thereof include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium phenylboron, sodium benzoate, potassium benzoate, cesium benzoate, lithium benzoate, disodium hydrogen phosphate, dipotassium hydrogen phosphate, dilithium hydrogen phosphate, disodium phenyl phosphate, a disodium salt, dipotassium salt, dicesium salt or dilithium salt of bisphenol A, and a sodium salt, potassium salt, cesium salt or lithium salt of phenol. From the viewpoint of the catalytic effect, price, distribution amount, influence on the color phase of resin, etc., sodium carbonate and sodium hydrogen carbonate are preferred.

Examples of the alkaline earth metal compound include an organic salt, inorganic salt, oxide, hydroxide, hydride or alkoxide of an alkaline earth metal compound, etc. Specific examples thereof include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate and magnesium phenyl phosphate.

Examples of the nitrogen-containing compound include quaternary ammonium hydroxides and salts thereof, and amines. Specific examples thereof include: quaternary ammonium hydroxides having an alkyl group, aryl group or the like such as tetramethylammonium hydroxide, tetraethylammonium hydroxide, tetrapropylammonium hydroxide, tetrabutylammonium hydroxide and trimethylbenzylammonium hydroxide; tertiary amines such as triethylamine, dimethylbenzylamine and triphenylamine; secondary amines such as diethylamine and dibutylamine; primary amines such as propylamine and butylamine; imidazoles such as 2-methylimidazole, 2-phenylimidazole and benzimidazole; and bases or basic salts such as ammonia, tetramethylammonium borohydride, tetrabutylammonium borohydride, tetrabutylammonium tetraphenylborate and tetraphenylammonium tetraphenylborate.

As the transesterification catalyst, salts of zinc, tin, zirconium and lead are preferably used. These substances may be used solely, or two or more of them may be used in combination. Further, these substances may be used in combination with the above-described alkali metal compound or alkaline earth metal compound.

As the transesterification catalyst, zinc acetate, zinc benzoate, zinc 2-ethylhexanoate, tin(II) chloride, tin(IV) chloride, tin(II) acetate, tin(IV) acetate, dibutyltin dilaurate, dibutyltin oxide, dibutyltin dimethoxide, zirconium acetylacetonato, zirconium oxyacetate, zirconium tetrabutoxide, lead(II) acetate, lead(IV) acetate or the like is specifically used.

These catalysts are used at a ratio of preferably $1 \times 10^{-9}$ to $1 \times 10^{-3}$ mol, and more preferably $1 \times 10^{-7}$ to $1 \times 10^{-4}$ mol relative to 1 mol of the sum of the diol compounds.

In the melt polycondensation method, using the aforementioned raw materials and catalyst, melt polycondensation is carried out while removing a by-product by means of the transesterification reaction under heating conditions and under ordinary pressure or reduced pressure. The reaction is generally performed with two or more stages.

Specifically, the first-stage reaction is performed at 120 to 260° C., and preferably 180 to 240° C., and for 0.1 to 5 hours, and preferably 0.5 to 3 hours. Subsequently, the pressure reducing degree of the reaction system is increased while increasing the reaction temperature to react the diol compound with the carbonic acid diester, and finally, a polycondensation reaction is performed under a reduced pressure of 1 mmHg or less at 200 to 350° C. for 0.05 to 2 hours. The reaction may be either a continuous type or a batch type. The reaction apparatus to be used for performing the reaction may be a vertical apparatus equipped with an anchor type stirring blade, maxblend stirring blade, helical-ribbon type stirring blade or the like, or a horizontal apparatus equipped with a paddle blade, lattice blade, spectacle-shaped blade or the like, or an extruder-type apparatus equipped with a screw. Further, in consideration of the viscosity of a polymerized product, use of these reaction apparatuses in suitable combination is preferred.

In the method for producing the polycarbonate copolymer of the present invention, after the polymerization reaction is completed, in order to maintain thermal stability and hydrolytic stability, the catalyst may be removed or deactivated. In general, a method for deactivating a catalyst by means of addition of a publicly-known acidic substance is suitably carried out. As such substances, specifically, esters such as butyl benzoate; aromatic sulfonic acids such as p-toluenesulfonic acid; aromatic sulfonic acid esters such as butyl p-toluenesulfonate and hexyl p-toluenesulfonate; phosphoric acids such as phosphorous acid, phosphoric acid and phosphonic acid; phosphorous acid esters such as triphenyl phosphite, monophenyl phosphite, diphenyl phosphite, diethyl phosphite, di-n-propyl phosphite, di-n-butyl phosphite, di-n-hexyl phosphite, dioctyl phosphite and monooctyl phosphite; phosphoric acid esters such as triphenyl phosphate, diphenyl phosphate, monophenyl phosphate, dibutyl phosphate, dioctyl phosphate and monooctyl phosphate; phosphonic acids such as diphenylphosphonic acid, dioctylphosphonic acid and dibutylphosphonic acid; phosphonic acid esters such as diethyl phenylphosphonate; phosphines such as triphenyl phosphine and bis(diphenylphosphino)ethane; boric acids such as boric acid and phenylboric acid; aromatic sulfonates such as dodecylbenzenesulfonic acid tetrabutylphosphonium salt; organic halides such as stearic acid chloride, benzoyl chloride and p-toluenesulfonic acid chloride; alkyl sulfates such as dimethyl sulfate; organic halides such as benzyl chloride; etc. are preferably used. From the viewpoint of the deactivating effect, color phase of the resin and stability, butyl p-toluenesulfonate is preferably used. These deactivating agents are used in an amount of preferably 0.01 to 50 times, and more preferably 0.3 to 20 times the molar quantity of the catalyst. When the amount is less than 0.01 times the molar quantity of the catalyst, the deactivating effect is insufficient and therefore it is undesirable. When the amount is more than 50 times the molar quantity of the catalyst, heat resistance is reduced and a molded body tends to be easily colored, and therefore it is undesirable.

After the catalyst is deactivated, a process of devolatilizing and removing a low boiling point compound in the polymer under a pressure of 0.1 to 1 mmHg and at a temperature of 200 to 350° C. may be carried out. In this process, a horizontal apparatus equipped with a stirring blade having excellent surface renewal ability such as a paddle blade, a lattice blade and a spectacle-shaped blade, or a thin film evaporator is suitably used.

It is desired that the content of foreign materials in the polycarbonate copolymer of the present invention is as small as possible, and filtration of a melting raw material and filtration of a catalyst solution are suitably carried out. The mesh of the filter is preferably 5 μm or less, and more preferably 1 μm or less. Moreover, filtration of the produced resin using a polymer filter is suitably carried out. The mesh of the polymer filter is preferably 100 μm or less, and more preferably 30 μm or less. Further, the process of obtaining a resin pellet should definitely be carried out in a low-dust environment, which is preferably Class 1000 or lower, and more preferably Class 100 or lower.

(c) Physical Properties of Polycarbonate Copolymer

The glass transition temperature (Tg) of the polycarbonate copolymer of the present invention is preferably 95 to 180° C., more preferably 100 to 160° C., and particularly preferably 105 to 155° C. The preferred lower limit of the glass transition temperature (Tg) is, for example, 110° C. or 120° C., and the preferred upper limit of the glass transition temperature (Tg) is, for example, 150° C. When Tg is lower than 95° C., the range of the operating temperature of lenses and cameras is narrowed, and therefore it is undesirable. When Tg is higher than 180° C., molding conditions at the time of injection molding become more strict, and therefore it is undesirable.

The polycarbonate copolymer of the present invention has a refractive index, which is measured after molding according to the method of JIS-K-7142, of preferably 1.49 to 1.55, and more preferably 1.50 to 1.53.

The polycarbonate copolymer of the present invention has an Abbe number, which is measured after molding according to the method of JIS-K-7142, of preferably 55.0 or more, more preferably 56.0 or more, and particularly preferably 57.0 or more. The upper limit of the Abbe number is about 60.0.

The polycarbonate copolymer of the present invention has a total light transmittance, which is measured after molding by integrating-sphere photoelectric photometry, of preferably 85.0% or higher, and more preferably 87.0% or higher. The upper limit of the total light transmittance is about 99%.

The polycarbonate copolymer of the present invention has a water absorption rate, which is measured according to the method of JIS-K-7209, of preferably 0.2 to 2.0%, and more preferably 0.3 to 1.5%.

The hygroscopic expansion coefficient of the polycarbonate copolymer of the present invention is preferably 0.01 to 0.5%, and more preferably 0.03 to 0.4%. The measurement of the hygroscopic expansion coefficient is carried out using a micrometer (accuracy: 1/1000 mm). The diameter of a circular plate for use in the measurement of the water absorption rate is measured, and the rate of change of the diameter before and after water absorption (%) is regarded as the hygroscopic expansion coefficient.

The polystyrene equivalent weight-average molecular weight (Mw) of the polycarbonate copolymer of the present invention is preferably 20,000 to 70,000. The polystyrene equivalent weight-average molecular weight (Mw) is more preferably 25,000 to 65,000, and particularly preferably 30,000 to 60,000. When Mw is less than 20,000, an optical lens becomes fragile, and therefore it is undesirable. When Mw is more than 70,000, the melt viscosity increases, resulting in difficulty in taking out a resin after the production, and in addition, the flowability is reduced, resulting in difficulty in injection molding in a molten state, and therefore it is undesirable.

The melt flow rate (MVR) of the polycarbonate copolymer of the present invention is preferably 10 to 80, and more preferably 20 to 60.

The reduced viscosity (ηsp/C) of the polycarbonate copolymer of the present invention is preferably 0.20 dl/g or more, and more preferably 0.23 to 0.84 dl/g.

(d) Optical Lens

The optical lens of the present invention can be obtained by injection-molding the above-described polycarbonate copolymer of the present invention into a lens shape using an injection molding machine or injection compression molding machine. The molding conditions for injection molding are not particularly limited, but the molding temperature is preferably 180 to 280° C., and the injection pressure is preferably 50 to 1700 kg/cm$^2$.

In order to avoid mixing of a foreign material in the optical lens as much as possible, the molding environment must be a low-dust environment, and it is preferably Class 1000 or lower, and more preferably Class 100 or lower.

The optical lens of the present invention is preferably used in the form of an aspherical lens according to need. In the case of the aspherical lens, since the spherical aberration can be adjusted to be substantially zero by one lens, it is not necessary to remove the spherical aberration by combining a plurality of spherical lenses, and reduction in weight and reduction in the production cost can be carried out. Accordingly, the aspherical lens is particularly useful as a camera lens among optical lenses. The astigmatism of the aspherical lens is preferably 0 to 15 mλ, and more preferably 0 to 10 mλ.

The thickness of the optical lens of the present invention can be set in a wide range depending on intended uses and is not particularly limited, but is preferably 0.01 to 30 mm, and more preferably 0.1 to 15 mm. To the surface of the optical lens of the present invention, a coat layer such as an antireflection layer, a hard coat layer or the like may be provided according to need. The antireflection layer may be either a single layer or a multilayer, and may be made of either an organic substance or an inorganic substance, but is preferably made of an inorganic substance. Specific examples thereof include oxides and fluorides such as silicon oxide, aluminium oxide, zirconium oxide, titanium oxide, cerium oxide, magnesium oxide and magnesium fluoride. Among them, more preferred are silicon oxide and zirconium oxide, and even more preferred is a combination of silicon oxide and zirconium oxide. Regarding the antireflection layer, the combination of single layer(s)/multilayer (s), components thereof, the combination of thicknesses, etc. are not particularly limited, but the antireflection layer preferably has a two-layer structure or three-layer structure, and particularly preferably has a three-layer structure. The thickness of the entire antireflection layer to be formed is preferably 0.00017 to 3.3% of the thickness of the optical lens, specifically, 0.05 to 3 μm, and particularly preferably 1 to 2 μm.

EXAMPLES

Hereinafter, the present invention will be specifically described by way of examples, but the present invention is not limited thereto. Note that measurement values in the Examples were measured using the below-described methods and apparatuses.

1) Polystyrene equivalent weight-average molecular weight (Mw): Using GPC and tetrahydrofuran as a developing solvent, a calibration curve was produced using a standard polystyrene having an already-known molecular weight (molecular weight distribution=1). Based on this calibration curve, Mw was calculated from the GPC retention time.
2) Glass transition temperature (Tg): It was measured using a differential scanning calorimeter (DSC).
3) Refractive index (nD), Abbe number (vD): The polycarbonate copolymer was press-molded into a circular plate (40φ, thickness: 3 mm) (molding conditions: 200° C., 100 kgf/cm$^2$, 2 minutes). It was cut at right angles to be measured with Kalnew KPR-200.
4) Total light transmittance: The measurement was carried out using MODEL1001 DP manufactured by Nippon Denshoku Industries Co., Ltd. Note that the total light transmittance of a circular plate obtained by press molding (thickness: 3 mm) was measured.
5) Water absorption rate:

A circular plate having a thickness of 2 mm was prepared and subjected to the measurement based on JIS-K-7209. The weight before and after water absorption was measured using a precision balance (minimum: 0.1 mg), and the increase of the weight was regarded as the water absorption rate.

Water absorption rate=(weight after water absorption−weight before water absorption)×100/(weight before water absorption)

Monomer Synthesis Example 1 (Synthesis of D-NDM)

173 g (2.01 mol) of methyl acrylate and 167 g (1.26 mol) of dicyclopentadiene were put into a 500 ml stainless steel reactor, and the mixture was reacted at 195° C. for 2 hours. A reaction solution containing 96 g of a monoolefin represented by formula (3a) below was obtained, and this was purified by distillation, and after that, a part of the product was used in the subsequent-stage reaction.

With a 300 ml stainless steel reactor, the hydroformylation reaction of the monoolefin represented by formula (3a) purified by distillation was performed using a CO/H$_2$ mixed gas (molar ratio of CO/H$_2$=1). 70 g of the monoolefin represented by formula (3a), 140 g of toluene, 0.50 g of triphenyl phosphite and 550 μl of a toluene solution of Rh(acac)(CO)$_2$ separately prepared (concentration: 0.003 mol/L) were put into the reactor. Substitution with nitrogen and substitution with the CO/H$_2$ mixed gas were respectively performed 3 times. After that, the inside of the system was pressurized with the CO/H$_2$ mixed gas, and the reaction was performed at 100° C. and 2 MPa for 5 hours. After the reaction was completed, gas chromatography analysis of the reaction solution was carried out to confirm that it is a reaction solution containing 76 g of a bifunctional compound represented by formula (2a) below and 1.4 g of the monoolefin represented by formula (3a) (conversion rate: 98%, selectivity: 97%). Subsequently, this was purified by distillation, and after that, a part of the product was used in the subsequent-stage reaction.

50 g of the bifunctional compound represented by formula (2a) purified by distillation, 10 g of a Cu—Zn—Al catalyst (E-01X manufactured by JGC Catalysts and Chemicals Ltd.) and 150 g of toluene were put into a 300 ml stainless steel reactor. The inside of the system was pressurized with hydrogen gas, and the reaction was performed at 10 MPa and 215° C. for 8 hours. After the reaction, the obtained slurry was diluted with methanol and the catalyst was filtered using a membrane filter having a pore diameter of 0.2 μm. After that, the solvent was distilled away using an evaporator, and gas chromatography analysis and GC-MS analysis were carried out to confirm that 43 g of the main product having a molecular weight of 222 was contained (yield of the main product: 96%). This was further purified by distillation to obtain the main product.

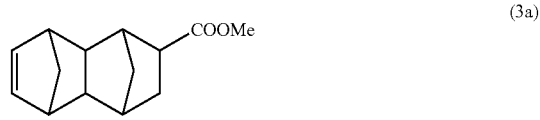

(3a)

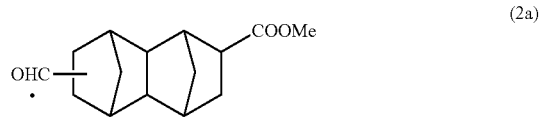

(2a)

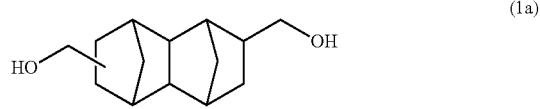

(1a)

(In the formula, Me represents a methyl group.)

<Identification of Monomer>

NMR analysis, gas chromatography analysis and GC-MS analysis of the component obtained in Monomer Synthesis Example 1 were carried out. Spectra of $^1$H-NMR, $^{13}$C-NMR and COSY-NMR of the main reaction product obtained in Monomer Synthesis Example 1 are shown in FIGS. 1 to 3.

1) NMR Measurement Conditions

Apparatus: JNM-ECA500 (500 MHz) manufactured by JEOL Ltd.

Measurement mode: 1H-NMR, 13C-NMR, COSY-NMR

Solvent: CD$_3$OD (deuterated methanol)

Internal standard substance: tetramethylsilane

2) Gas Chromatography Measurement Conditions

Analyzer: Capillary Gas Chromatograph GC-2010 Plus manufactured by Shimadzu Corporation Analysis column: InertCap 1 manufactured by GL Sciences Inc. (30 m, 0.32 mm I.D., film thickness: 0.25 μm)

Temperature of oven: 60° C. (held for 0.5 minute)-increased at 15° C./min-280° C. (held for 4 minutes)

Detector: FID, temperature: 280° C.

3) GC-MS Measurement Conditions

Analyzer: GCMS-QP2010 Plus manufactured by Shimadzu Corporation

Ionization voltage: 70 eV

Analysis column: DB-1 manufactured by Agilent Technologies (30 m, 0.32 mm I.D., film thickness: 1.00 μm)

Temperature of oven: 60° C. (held for 0.5 minute)-increased at 15° C./min-280° C. (held for 4 minutes)

Temperature of detector: 280° C.

According to GC-MS analysis and the results of NMR analysis shown in FIGS. 1 to 3, it was confirmed that the main product obtained in Monomer Synthesis Example 1 is the diol compound represented by the aforementioned formula (1a) (D-NDM). In addition, according to gas chromatography analysis, it was confirmed that the obtained diol compound is an isomer mixture, which contains an isomer containing a hydroxymethyl group at 2,6-position (76% by mass) and an isomer containing a hydroxymethyl group at 2,7-position (24% by mass).

Example 1

34.40 g (0.155 mol) of D-NDM represented by formula (1a) obtained in Monomer Synthesis Example 1, 20.19 g (0.066 mol) of spiroglycol (SPG), 47.49 g (0.106 mol) of diphenyl carbonate and 0.22 mg (2.6 µmol) of sodium hydrogencarbonate were put into a 300 mL reactor equipped with a stirrer and a distillation apparatus, and it was heated to 215° C. over 1 hour under nitrogen atmosphere (760 Torr) and stirred. Heating was carried out in oil bath, and a transesterification reaction was initiated when the temperature reached 200° C. 5 minutes after the initiation of the reaction, stirring was started, and 20 minutes later, the pressure was reduced from 760 Torr to 200 Torr over 10 minutes. The temperature was increased to 210° C. while reducing the pressure, and increased to reach 220° C. 70 minutes after the initiation of the reaction. 80 minutes after the initiation of the reaction, the pressure was reduced to 150 Torr over 30 minutes, and the temperature was increased to 240° C. while reducing the pressure to 1 Torr. After that, it was kept for 10 minutes, thereby obtaining a polycarbonate copolymer.

Regarding the obtained polycarbonate copolymer, Mw was 38,000 and Tg was 120° C. Further, the refractive index was 1.512 and the Abbe number was 57.7. The total light transmittance was 89% and the water absorption rate was 0.3% by mass. The amounts of phenol, diphenyl carbonate and D-NDM in the obtained polycarbonate copolymer were 280 ppm, 100 ppm and 20 ppm, respectively.

The $^1$H-NMR measurement results of the polycarbonate copolymer obtained in Example 1 are shown in FIG. 4.

Example 2

24.90 g (0.112 mol) of D-NDM represented by formula (1a) obtained in Monomer Synthesis Example 1, 12.42 g (0.085) of isosorbide (ISB), 42.63 g (0.199 mol) of diphenyl carbonate and 0.19 mg (2.3 µmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate copolymer.

Regarding the obtained polycarbonate copolymer, Mw was 45,000 and Tg was 145° C. Further, the refractive index was 1.521 and the Abbe number was 58.0. The total light transmittance was 89% and the water absorption rate was 1.1% by mass. The amounts of phenol, diphenyl carbonate and D-NDM in the obtained polycarbonate copolymer were 250 ppm, 100 ppm and 20 ppm, respectively.

Example 3

30.02 g (0.135 mol) of D-NDM represented by formula (1a) obtained in Monomer Synthesis Example 1, 6.00 g (0.020 mol) of spiroglycol (SPG), 6.00 g (0.041 mol) of isosorbide (ISB), 42.09 g (0.197 mol) of diphenyl carbonate and 0.20 mg (2.3 µmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate copolymer. The amounts of phenol, diphenyl carbonate and D-NDM in the obtained polycarbonate copolymer were 290 ppm, 100 ppm and 20 ppm, respectively.

Regarding the obtained polycarbonate copolymer, Mw was 40,000 and Tg was 131° C. Further, the refractive index was 1.519 and the Abbe number was 57.8. The total light transmittance was 90% and the water absorption rate was 0.6% by mass.

Example 4

10.51 g (0.047 mol) of D-NDM represented by formula (1a) obtained in Monomer Synthesis Example 1, 23.48 g (0.161) of isosorbide (ISB), 44.49 g (0.208 mol) of diphenyl carbonate and 0.17 mg (2.0 µmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate copolymer.

Regarding the obtained polycarbonate copolymer, Mw was 39,000 and Tg was 152° C. Further, the refractive index was 1.510 and the Abbe number was 59.0. The total light transmittance was 90% and the water absorption rate was 1.9% by mass.

Example 5

8.00 g (0.036 mol) of D-NDM represented by formula (1a) obtained in Monomer Synthesis Example 1, 32.40 g (0.106 mol) of spiroglycol (SPG), 30.98 g (0.145 mol) of diphenyl carbonate and 0.14 mg (1.7 µmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate copolymer.

Regarding the obtained polycarbonate copolymer, Mw was 32,000 and Tg was 100° C. Further, the refractive index was 1.490 and the Abbe number was 58.7. The total light transmittance was 89% and the water absorption rate was 0.3% by mass.

Example 6

25.20 g (0.113 mol) of D-NDM represented by formula (1a) obtained in Monomer Synthesis Example 1, 7.01 g (0.049 mol) of 1,4-cyclohexanedimethanol (CHDM), 34.80 g (0.162 mol) of diphenyl carbonate and 0.18 mg (2.1 µmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate copolymer.

Regarding the obtained polycarbonate copolymer, Mw was 55,000 and Tg was 110° C. Further, the refractive index was 1.527 and the Abbe number was 57.2. The total light transmittance was 88% and the water absorption rate was 0.3% by mass.

Example 7

20.51 g (0.092 mol) of D-NDM represented by formula (1a) obtained in Monomer Synthesis Example 1, 10.37 g (0.040 mol) of pentacyclopentadecanedimethanol (PCPDM), 28.36 g (0.132 mol) of diphenyl carbonate and 0.13 mg (1.6 µmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate copolymer.

Regarding the obtained polycarbonate copolymer, Mw was 35,000 and Tg was 136° C. Further, the refractive index was 1.533 and the Abbe number was 56.9. The total light transmittance was 90% and the water absorption rate was 0.3% by mass.

Example 8

22.18 g (0.100 mol) of D-NDM represented by formula (1a) obtained in Monomer Synthesis Example 1, 8.39 g (0.043 mol) of tricyclodecanedimethanol (TCDDM), 30.67 g (0.143 mol) of diphenyl carbonate and 0.14 mg (1.7 μmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate copolymer.

Regarding the obtained polycarbonate copolymer, Mw was 42,000 and Tg was 119° C. Further, the refractive index was 1.530 and the Abbe number was 57.2. The total light transmittance was 89% and the water absorption rate was 0.3% by mass.

Example 9

6.55 g (0.029 mol) of D-NDM represented by formula (1a) obtained in Monomer Synthesis Example 1, 21.95 g (0.072 mol) of spiroglycol (SPG), 16.08 g (0.043 mol) of 9,9-bis(4-hydroxy-3-methylphenyl)fluorene (BCFL), 31.26 g (0.146 mol) of diphenyl carbonate and 0.14 mg (1.7 μmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate copolymer.

Regarding the obtained polycarbonate copolymer, Mw was 41,000 and Tg was 141° C.

Comparative Example 1

23.11 g (0.104 mol) of D-NDM represented by formula (1a) obtained in Monomer Synthesis Example 1, 10.17 g (0.045 mol) of bisphenol A, 32.01 g (0.149 mol) of diphenyl carbonate and 0.15 mg (1.8 μmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate copolymer.

Regarding the obtained polycarbonate copolymer, Mw was 35,000 and Tg was 140° C. Further, the refractive index was 1.553 and the Abbe number was 41.0. The total light transmittance was 88% and the water absorption rate was 0.3% by mass.

Comparative Example 2

20.99 g (0.094 mol) of D-NDM represented by formula (1a) obtained in Monomer Synthesis Example 1, 9.24 g (0.040 mol) of bisphenol A, 28.89 g (0.135 mol) of diphenyl carbonate and 0.13 mg (1.6 μmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate copolymer.

Regarding the obtained polycarbonate copolymer, Mw was 35,000 and Tg was 139° C. Further, the refractive index was 1.546 and the Abbe number was 44.8. The total light transmittance was 89% and the water absorption rate was 0.3% by mass.

Comparative Example 3

30.9 g (0.139 mol) of D-NDM represented by formula (1a) obtained in Monomer Synthesis Example 1, 29.8 g (0.139 mol) of diphenyl carbonate and 0.09 mg (1.1 μmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate resin.

Regarding the obtained polycarbonate resin, Mw was 38,000 and Tg was 137° C. Further, the refractive index was 1.531 and the Abbe number was 57.1. The total light transmittance was 89% and the water absorption rate was 0.3% by mass.

Comparative Example 4

30.61 g (0.101 mol) of spiroglycol (SPG), 21.97 g (0.103 mol) of diphenyl carbonate and 0.10 mg (1.2 μmol) of sodium hydrogencarbonate were put into a 300 mL reactor equipped with a stirrer and a distillation apparatus, and the operation was carried out in a manner similar to that in Example 1 except for the feed amounts to try to obtain a polycarbonate resin. However, crystallization proceeded while polymerization proceeded, and it was impossible to obtain a polymer.

Comparative Example 5

36.29 g (0.248 mol) of isosorbide (ISB), 53.46 g (0.250 mol) of diphenyl carbonate and 0.2 mg (2.5 μmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate resin.

Regarding the obtained polycarbonate resin, Mw was 38,000 and Tg was 165° C. Further, the refractive index was 1.500 and the Abbe number was 59.8. The total light transmittance was 90% and the water absorption rate was 3.0% by mass.

Comparative Example 6

18.68 g (0.084 mol) of D-NDM represented by formula (1a) obtained in Monomer Synthesis Example 1, 15.78 g (0.036 mol) of 9,9-bis(4-(2-hydroxyethoxy)phenyl)fluorene, 25.91 g (0.121 mol) of diphenyl carbonate and 0.13 mg (1.6 μmol) of sodium hydrogencarbonate were put into a 300 mL reactor equipped with a stirrer and a distillation apparatus, and the operation was carried out in a manner similar to that in Example 1 except for the feed amounts, thereby obtaining a polycarbonate copolymer.

Regarding the obtained polycarbonate copolymer, Mw was 30,000 and Tg was 138° C. Further, the refractive index was 1.578 and the Abbe number was 34.2. The total light transmittance was 89% and the water absorption rate was 0.3% by mass. The amounts of phenol, diphenyl carbonate, D-NDM and 9,9-bis(4-(2-hydroxyethoxy)phenyl)fluorene in the obtained polycarbonate copolymer were 300 ppm, 250 ppm, 25 ppm and 20 ppm, respectively.

Note that the amounts of phenol, diphenyl carbonate, D-NDM and 9,9-bis(4-(2-hydroxyethoxy)phenyl)fluorene in the obtained polycarbonate copolymer were analyzed by LC-MS. The column used for LC-MS was a reverse phase column ZORBAX Eclipse XDB-18 manufactured by Agilent Technologies. As a mobile phase, aqueous solution of ammonium acetate, tetrahydrofuran and methanol were used in the gradient program. The column temperature was 45° C. and the detector was at 225 nm. A calibration curve was made by using pure products of respective compounds as preparations and quantitation was carried out. 0.5 g of the polycarbonate copolymer was dissolved in 50 ml of tetrahydrofuran, then it was filtered using a filter, and 2 μl of this measurement solution was injected for the measurement.

tablets which have a small lens unit. Moreover, according to the present invention, an aspherical lens having a high Abbe number, which is technically difficult to obtain by processing a glass lens, can be conveniently obtained by injection molding, and therefore it is very useful. Furthermore, it is very useful for the correction of partial chromatic aberration associated with recent need for wider angles of cameras. In addition, the polycarbonate copolymer produced by using the three types of diol compounds including the fluorene-based diol compound is useful as films including organic RL films and antireflection films.

TABLE 1

|  |  | Example 1 | Example 2 | Example 3 | Example 4 | Example 5 | Example 6 | Example 7 |
|---|---|---|---|---|---|---|---|---|
| D-NDM | mol % | 70 | 57 | 69 | 23 | 25 | 70 | 70 |
| SPG | mol % | 30 | — | 10 | — | 75 | — | — |
| ISB | mol % | — | 43 | 21 | 77 | — | — | — |
| CHDM | mol % | — | — | — | — | — | 30 | — |
| PCPDM | mol % | — | — | — | — | — | — | 30 |
| TCDDM | mol % | — | — | — | — | — | — | — |
| BPA | mol % | — | — | — | — | — | — | — |
| BPEF | mol % | — | — | — | — | — | — | — |
| Refractive index | nd | 1.512 | 1.521 | 1.519 | 1.510 | 1.490 | 1.527 | 1.533 |
| Abbe number | νD | 57.7 | 58.0 | 57.8 | 59.0 | 58.7 | 57.2 | 56.9 |
| Total light transmittance | % | 89 | 89 | 90 | 90 | 89 | 88 | 90 |
| Tg | ° C. | 120 | 145 | 131 | 152 | 100 | 110 | 136 |
| Mw | — | 38000 | 45000 | 40000 | 39000 | 32000 | 55000 | 35000 |
| Water absorption rate | % by mass | 0.3 | 1.1 | 0.6 | 1.9 | 0.3 | 0.3 | 0.3 |

|  | Example 8 | Comparative Example 1 | Comparative Example 2 | Comparative Example 3 | Comparative Example 4 | Comparative Example 5 | Comparative Example 6 |
|---|---|---|---|---|---|---|---|
| D-NDM | 70 | 57 | 70 | 100 | — | — | 70 |
| SPG | — | — | — | — | 100 | — | — |
| ISB | — | — | — | — | — | 100 | — |
| CHDM | — | — | — | — | — | — | — |
| PCPDM | — | — | — | — | — | — | — |
| TCDDM | 30 | — | — | — | — | — | — |
| BPA | — | 43 | 30 | — | — | — | — |
| BPEF | — | — | — | — | — | — | 30 |
| Refractive index | 1.530 | 1.553 | 1.546 | 1.531 | — | 1.500 | 1.578 |
| Abbe number | 57.2 | 41.0 | 44.8 | 57.1 | — | 59.8 | 34.2 |
| Total light transmittance | 89 | 88 | 89 | 89 | — | 90 | 89 |
| Tg | 119 | 140 | 139 | 137 | — | 165 | 138 |
| Mw | 42000 | 35000 | 35000 | 38000 | — | 38000 | 30000 |
| Water absorption rate | 0.3 | 0.3 | 0.3 | 0.3 | — | 3.0 | 0.3 |

D-NDM: decahydro-1,4:5,8-dimethanonaphthalene diol (forming the structural unit represented by general formula (K))
SPG: spiroglycol (forming the structural unit represented by formula (2))
ISB: isosorbide (forming the structural unit represented by formula (3))
CHDM: 1,4-cyclohexanedimethanol (forming the structural unit represented by formula (4))
PCPDM: pentacyclopentadecanedimethanol (forming the structural unit represented by formula (5))
TCDDM: tricyclodecanedimethanol (forming the structural unit represented by formula (6))
BPA: bisphenol A
BPEF: 9,9-bis(4-(2-hydroxyethoxy)phenyl)fluorene

INDUSTRIAL APPLICABILITY

According to the present invention, it is possible to obtain a polycarbonate copolymer having excellent optical characteristics with heat resistance and a high Abbe number, and an optical lens and a film obtained by using the same. The polycarbonate copolymer of the present invention can be subjected to injection molding, has a high productivity and is inexpensive, and therefore can be used in fields where expensive glass lenses having a high Abbe number are conventionally used including cameras, telescopes, binoculars and television projectors, and it is very useful. Further, since the Abbe number is further increased compared to existing materials, it is effective for the correction of chromatic aberration and the improvement of image quality can be expected. It is particularly suitable for smartphones and

The invention claimed is:
1. A polycarbonate copolymer, which comprises a structural unit represented by formula (K):

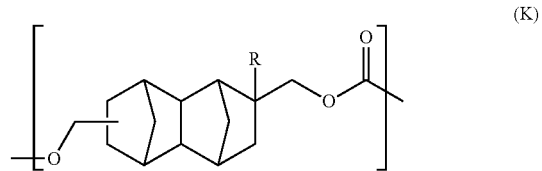

(K)

wherein in formula (K), R represents H, CH$_3$ or CH$_2$CH$_3$; and a structural unit represented by formula (1):

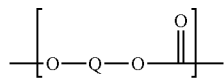
(1)

wherein in formula (1), Q represents a C5 or higher aliphatic hydrocarbon group optionally including a hetero atom, and wherein general formula (1) is at least one selected from the group consisting of formulae (2), (4), (5), and (6):

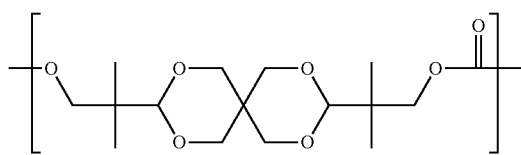
(2)

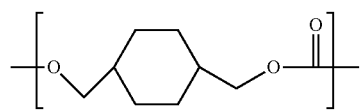
(4)

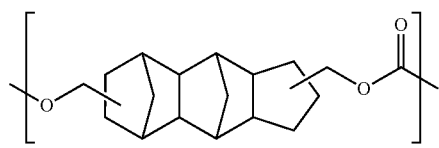
(5)

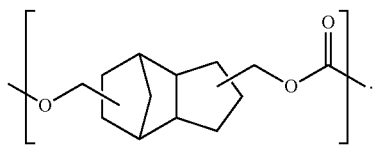
(6)

2. The polycarbonate copolymer according to claim 1, wherein formula (1) is formula (2).

3. The polycarbonate copolymer according to claim 1, wherein a copolymerization ratio (mol %) between the structural unit represented by formula (K) and the structural unit represented by formula (1) is such that the structural unit represented by formula (K): the structural unit represented by formula (1)=20:80 to 90:10.

4. The polycarbonate copolymer according to claim 1, wherein R in formula (K) is H.

5. The polycarbonate copolymer according to claim 1, which has an Abbe number of 55 or higher.

6. The polycarbonate copolymer according to claim 1, which has a polystyrene equivalent weight-average molecular weight of 20,000 to 70,000.

7. The polycarbonate copolymer according to claim 1, which further comprises a structural unit represented by formula (B):

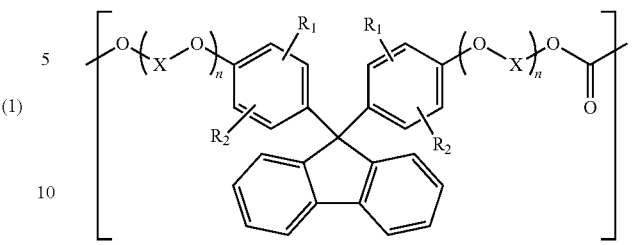
(B)

wherein: R$_1$ and R$_2$ are each independently selected from a hydrogen atom, a C$_{1-20}$ alkyl group, a C$_{1-20}$ alkoxyl group, a C$_{5-20}$ cycloalkyl group, a C$_{5-20}$ cycloalkoxyl group, a C$_{6-20}$ aryl group, a C$_{6-20}$ aryloxy group and a halogen atom; Xs each independently represent a branched or unbranched C$_{2-6}$ alkylene group; and n's each independently represent an integer of 0 to 5.

8. The polycarbonate copolymer according to claim 7, wherein: the ratio of the structural unit represented by formula (K) is 10 to 50 mol %; the ratio of the structural unit represented by formula (1) is 20 to 60 mol %; and the ratio of the structural unit represented by formula (B) is 20 to 40 mol %.

9. An optical lens obtained by using the polycarbonate copolymer according to claim 1.

10. A film obtained by using the polycarbonate copolymer according to claim 1.

11. A method for producing the polycarbonate copolymer according to claim 1, which comprises melt-polycondensating a dihydroxy compound comprising (i) a dihydroxy compound represented by formula (L):

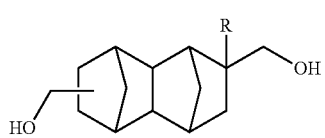
(L)

wherein in formula (L), R represents H, CH$_3$ or CH$_2$CH$_3$; and (ii) a dihydroxy compound represented by formula (I):

HO-Q-OH (I)

wherein in formula (I), Q represents a C5 or higher aliphatic hydrocarbon group optionally including a hetero atom, and wherein the formula (I) is at least one selected from the group consisting of formulae (2'), (4'), (5'), and (6'):

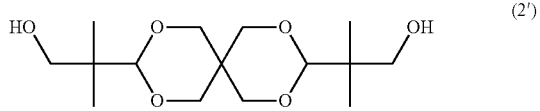
(2')

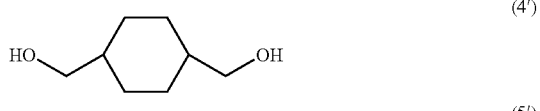
(4')

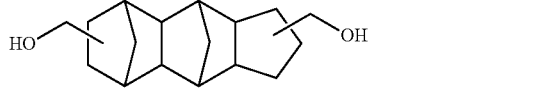
(5')

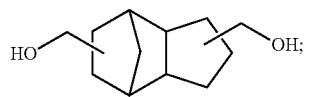 (6')
with a carbonic acid diester.
* * * * *